July 5, 1960

B. D. H. TELLEGEN 2,944,220

CIRCUIT ARRANGEMENT COMPRISING A PASSIVE
ELECTRICAL QUADRIPOLE

Original Filed May 11, 1953

*INVENTOR.*
B.D.H. TELLEGEN

BY
Frank R. Trifari

*AGENT*

United States Patent Office 2,944,220
Patented July 5, 1960

2,944,220

CIRCUIT ARRANGEMENT COMPRISING A PASSIVE ELECTRICAL QUADRIPOLE

Bernardus Dominicus Hubertus Tellegen, Eindhoven, Netherlands, assignor to North American Philips Company, Inc., Irvington, N.Y.

Continuation of application Ser. No. 354,095, May 11, 1953. This application Mar. 12, 1957, Ser. No. 645,539

Claims priority, application Netherlands Apr. 29, 1947

11 Claims. (Cl. 330—63)

This patent application is a continuation of the copending patent application Serial No. 354,950, filed May 11, 1953, which in turn is a continuation-in-part of patent application Serial No. 13,506, filed March 6, 1948 and issued as Patent No. 2,647,239, the claims of which have been disclaimed.

The present invention relates to electrical circuits, and more particularly to an electrical circuit arrangement in which a medium having gyromagnetic properties is employed for the transmission of electrical signals.

An object of the invention is to provide an improved electrical transmission circuit which has a greater transmission ratio than previous circuits. Other objects will be apparent.

The invention comprises, briefly, a medium having gyromagnetic properties and polarized in a first direction, a source of electrical signals coupled by an input circuit to the medium to produce a primary field in a second direction thereby to produce in the polarized medium a secondary field having a third direction, an output circuit coupled to the secondary field, and an impedance element connected between the input and output circuits. This transmission circuit has a signal transmission ratio which is greater, by a factor of $1+\sqrt{2}$, than that of prior circuits.

For the impedance elements connected between the terminals of a passive electrical quadripole or four terminal network, use has hitherto been limited to inductances (L), resistances (R), capacities (C) and ideal transformers as the basic circuit elements. The first three elements are dipoles, the relation between the instantaneous values of the current $i$ passing through and the voltage $v$ set up across the elements being given by $$v = L\frac{di}{dt}, \quad v = iR \quad \text{and} \quad v = \int \frac{i}{C} dt \text{ respectively}$$

An ideal transformer is a quadripole, in which between the instantaneous values of the primary and secondary voltages $v_1$ and $v_2$ and currents $i_1$ and $i_2$ there exists the relations:

$$i_1 = ni_2 \quad (1)$$
$$v_2 = nv_1$$

wherein the coefficient $n$ is the transformation ratio if the positive voltages and currents correspond to those indicated with the quadripole according to Fig. 1 as described more fully hereinafter.

The properties of quadripoles built up from such network elements may be summarized as follows:

(a) The relations between the currents passing through and the voltages set up across the primary and secondary terminals may be represented by linear differential equations.

(b) The coefficients of these differential equations are constant. If the electrical oscillations are assumed to be sinusoidal and if for the voltage and the current at the primary and secondary terminals of the quadripole the complex magnitudes $V_1$, $I_1$ and $V_2$, $I_2$ respectively are introduced, we find as the solution of the differential equations between these magnitudes the relations:

$$V_1 = Z_{11}I_1 + Z_{12}I_2 \quad (2)$$
$$V_2 = Z_{21}I_1 + Z_{22}I_2$$

the four pole parameters, $Z_{11}$, $Z_{12}$, $Z_{21}$ and $Z_{22}$ being functions of frequency.

(c) The quadripole cannot supply energy.

(d) Between the coefficients of the above quadripole equations there exists the so-called reciprocity relations:

$$Z_{12} = Z_{21} \quad (3)$$

The invention has for its object to provide an improved circuit arrangement which employs a fifth network element the properties of which conform to the properties of the other elements mentioned above save that the property of reciprocity mentioned in the above under $d$ is absent. The fifth circuit element has the property of gyrating a current into a voltage and vice versa. In the ideal case for this fifth element, the following relations exist between the instantaneous values of the voltage set up across, and the current passing through, the primary and secondary terminals:

$$v_1 = -si_2 \quad (4)$$
$$v_2 = si_1$$

respectively if the positive directions are again assumed to be in accordance with the quadripole shown in Fig. 1, the coefficients having the dimension of a resistance.

A network element to which these Equations (4) apply, will be referred to hereinafter as "ideal gyrator." An ideal gyrator consequently exhibits in contrast to the relation (3), the property that the "anti-reciprocity"

$$Z_{12} = -Z_{21} \quad (5)$$

applies.

In addition to the properties mentioned above under $a$, $b$ and $c$, of which the latter may be represented by the equation, $$i_1v_1 + i_2v_2 = 0 \quad (6)$$

which equation is also valid for the ideal transformer, an ideal gyrator furthermore has, for example, the following properties based on antireciprocity: a secondary short-circuit of an ideal gyrator will be manifested at the primary terminals as an infinitely high impedance, a secondary capacitive reactance will appear at the primary as an inductive reactance, and two cascade-connected gyrators have the property of a transformer.

So-called impedance-transforming networks are known, in which for a definite frequency the relations $$V_1 = jXI_2$$
$$V_2 = jXI_1$$

are satisfied. Here the proportionality factor $jX$ has the same sign, in contradistinction to the relations (4), in which the proportionality factor (5) is of opposite sign. Such networks consequently satisfy the reciprocity relation (3) and are therefore unsuitable for the purpose according to the invention.

A more extended treatment of the theoretical principles underlying the invention may be found in the article entitled, "The Gyrator, A New Electric Network Element" published in the "Philips Research Reports," volume 3, pages 88 to 101, April 1948. Reference is now made to the following detailed description of the invention, to be read in connection with the accompanying drawing, wherein.

Figure 1:
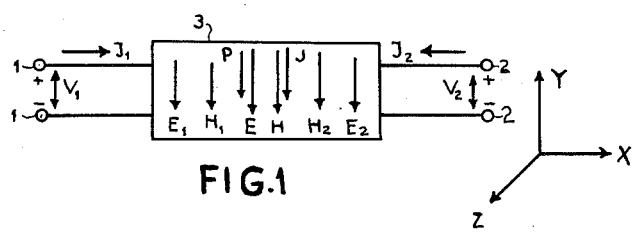
Fig. 1 is a schematic diagram illustrating the theory of a gyrator used in the invention.

The manner in which a gyrator used in the invention may be realized is explained with reference to Fig. 1. Let us assume that the voltage $V_1$ and the current $I_1$ at the primary terminals 1—1 of the quadripole shown in Fig. 1 produce an electric field having a field strength $E_1$ and a magnetic field having a field strength $H_1$, whereas the voltage $V_2$ and the current $I_2$ at the secondary terminals 2—2 of the quadripole produce an electric field having a field strength $E_2$ and a magnetic field having a field strength $H_2$ (for convenience all these vectors are shown in the figure parallel to one another, but, in general, they have an arbitrary direction with respect to one another). The resultant of the two fields is operative in a medium 3. The resultant of the electric fields has a value equal to E and that of the magnetic fields has a value H. Owing to the electric field of field strength E and the magnetic field of field strength H an electrical polarization P and a magnetic polarization J are produced in the medium 3. If these fields E and H and the corresponding polarizations P and J are resolved according to three mutually perpendicular axes $x$, $y$ and $z$ the components P and J may be supposed phenomenologically to vary linearly with the components E and H. For a medium causing no losses we then arrive at equations of the following form:

$$P_x = \kappa_{xx}E_x + (\kappa_{xy}+j\lambda_{xy})E_y + (\kappa_{xx}+j\lambda_{xx})E_x + (\gamma_{xx}+j\delta_{xx})H_x + (\gamma_{xy}+j\delta_{xy})H_y + (\gamma_{xx}+j\delta_{xx})H_x$$
$$P_y = (\kappa_{xy}-j\lambda_{xy})E_x + \kappa_{yy}E_y + (\kappa_{yz}+j\delta_{yz})E_z + (\gamma_{yx}+j\delta_{yx})H_x + (\gamma_{yy}+j\delta_{yy})H_y + (\gamma_{yz}+j\delta_{yz})H_z$$
$$P_z = (\kappa_{zx}-j\lambda_{zx})E_x + (\kappa_{yz}-j\lambda_{yz})E_y + \kappa_{zz}E_z + (\gamma_{zx}+j\delta_{zx})H_x + (\gamma_{zy}+j\delta_{zy})H_y + (\gamma_{zz}+j\delta_{zz})H_z$$
$$J_x = (\gamma_{xx}-j\delta_{xx})E_x + (\gamma_{yx}-j\delta_{yx})E_y + (\gamma_{zx}-j\delta_{zx})E_z + \chi_{xx}H_x + (\chi_{xy}+j\zeta_{xy})H_y + (\chi_{xz}+j\zeta_{xz})H_z$$
$$J_y = (\gamma_{xy}-j\delta_{xy})E_x + )\gamma_{yy}-j\delta_{yy})E_y + (\gamma_{zy}-j\delta_{zy})E_z + (\chi_{xy}-j\zeta_{xy})H_x + \chi_{yy}H_y + (\chi_{yz}+j\zeta_{yz})H_z$$
$$J_z = (\gamma_{xz}-j\delta_{xz})E_x + (\gamma_{yz}-j\delta_{yz})E_y + (\gamma_{zz}-j\delta_{zz})E_z + (\chi_{xz}-j\zeta_{xz})H_x + (\chi_{yz}-j\zeta_{yz})H_y + \chi_{zz}H_z$$

(7)

The coefficients in the principal diagonal are real; the coefficients lying symmetrically with respect to this diagonal are conjugate complex.

The coefficients consist of six groups of quantities, denoted by $\kappa$, $\lambda$, $\gamma$, $\delta$, $\chi$, $\zeta$, representing six different properties of the medium. If the terminal pairs of a four-pole are coupled to each other by means of one of these properties of the medium constituting the four-pole, this four-pole will be of a certain type.

In the first place this four-pole will or will not satisfy the reciprocity relation. To investigate this we differentiate the Equations (7) with respect to $t$. The left-hand sides will then become $dP_x/dt$, etc. and $dJ_x/dt$, etc., and the right-hand sides we may multiply by $j\omega$. Now $dP/dt$ is a part of a current, $dJ/dt$ is a part of a voltage, E is a part of a voltage, and H is a part of a current. So, bearing in mind what has been said with reference to Equations (3) and (5) about the way the reciprocity relation is expressed by equality or opposite equality of certain four-pole coefficients, we see that those four-poles of which the terminal pairs are coupled to each other by means of the property of the medium represented by $\kappa$, $\delta$, or $\chi$, or respectively by $\lambda$, $\gamma$, or $\zeta$, will, or respectively will not, satisfy the reciprocity relation of networks.

Furthermore, P and E are related to electric pairs of terminals and J and H to magnetic pairs. Therefore, if a transformer or a gyrator could be realized by coupling two terminal pairs by means of one of the above-mentioned six properties of a medium, coupling by $\kappa$ could lead only to a double-electric transformer,
$\lambda$ could lead only to a double-electric gyrator,
$\gamma$ could lead only to an electromagnetic gyrator,
$\delta$ could lead only to an electromagnetic transformer,
$\chi$ could lead only to a double-magnetic transformer,
$\zeta$ could lead only to a double-magnetic gyrator.

The coefficients $\kappa$ and $\zeta$ refer to the susceptibility of the material of the medium 3.

According to the invention, use is made of a medium such, or, if desired, of a medium brought into a state such, that it exhibits the property that at least one of the coefficients $\gamma$, $\lambda$ or $\zeta$ is unequal to zero, for if this is the case, it will be possible, by a coupling as indicated above between a primary and a secondary electric or magnetic field, to build up a gyrator which is ideal or nearly ideal. More particularly said gyrator quadripole is inserted between an input circuit such as the anode circuit of a first electron tube and an output circuit such as the grid circuit of a second electron tube, in addition to a resistive impedance element, to produce a higher transfer impedance of said electrical quadripole.

Figure 4:
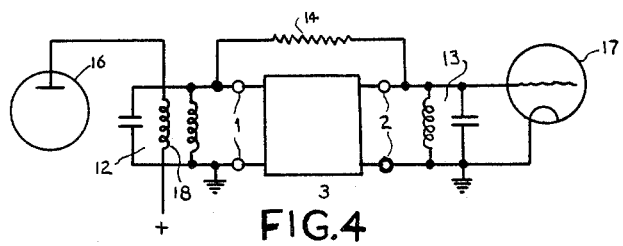
Fig. 4 is a band-pass filter circuit employing a gyrator element in accordance with the invention.
Figure 5:
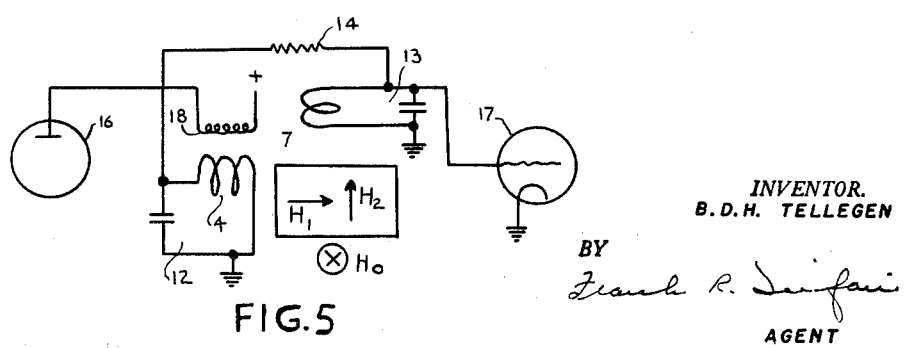
Fig. 5 is a detailed showing of the band-pass filter of Fig. 4, in which the gyrator of Fig. 2 is utilized.

Some examples of media will be discussed with reference to Figs. 2 and 3, one of the said coefficients being here unequal to zero. Figs. 4 and 5 show a practical example of a gyrator transmission circuit according to the invention.

Figure 2:
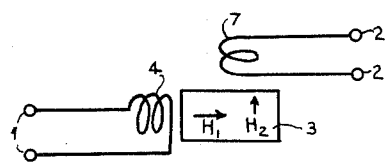
Fig. 2 is a first preferred embodiment of a gyrator element used in the invention.

Fig. 2 represents a gyrator in which for the medium use is made of a substance for which the coefficient $\zeta$ is unequal to zero. Such a substance may be obtained by using, for example, magnetic material adapted to be brought into the state of saturation by a constant magnetic field of low field strength $H_0$, thus polarizing the medium 3 in a first direction. The primary terminals 1 have connected to them a winding 4 serving as a signal input means to the medium 3, a primary magnetic field of field strength $H_1$, in a second direction different from the direction of field $H_0$, being produced by the current passing through this winding 4. Owing to the gyromagnetic effect the combination of this alternating field $H_1$ and the field $H_0$ produces, in a third direction different from, and preferably at right angles, to these two fields a magnetic alternating field $H_2$ which induces in a winding 7, serving as a signal output means for the medium 3 and preferably positioned perpendicular to the winding 4 as shown and connected to the secondary terminals 2, a voltage which is proportional to the current supplied to the primary terminals 1. In order to guarantee an optimum ideal gyrator effect, it is desirable that the mutual induction between the coils 4 and 7 should be minimum.

Figure 3A:
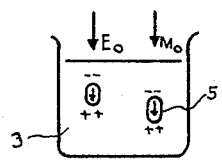
Fig. 3a is a schematic diagram illustrating the method of producing a medium for a gyrator.
Figure 3B:
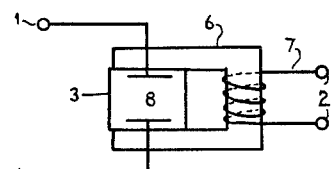
Fig. 3b is a second preferred embodiment of a gyrator element used in the invention.

Fig. 3a illustrates, by way of example, a method of manufacturing a medium 3 for which the coefficient $\gamma$ is unequal to zero. For this purpose a suspension of magnetic material is made in a carrier liquid in which, moreover, an oversaturated solution of a material having a high electrical dipole moment is formed. This liquid is subjected to the action of a strong electric and magnetic field ($E_0$, $M_0$), the field strengths of which are parallel to one another and are directed in the same or in opposite sense. A thin film of electric dipole material will now be formed around the magnetic dipoles 5, the magnetic and electric polarities having the same or opposite sense. If a medium 3, built up from such a magnetic material wherein the elementary magnets have at the same time a great magnetic dipole moment and, parallel thereto, a permanent electric dipole moment, is brought between the poles of a magnetic circuit 6 (Fig. 3b), a magnetic flux will be produced in the circuit 6 if a current is supplied to the electrodes 8 connected to the primary terminals 1, owing to which the winding 7 connected to the terminals 2 has induced in it a voltage which is proportional to the current supplied to the primary terminals 1.

A circuit-arrangement in which the medium has a coefficient λ which is unequal to zero, may be constructed, for example, in a manner similar to that shown in Fig. 2, the coils 4 and 7 being replaced by condenser plates.

The invention is not considered to be restricted to gyrators comprising media of which only one of the coefficients γ, λ or ζ is unequal to zero; it is possible that at the same time more than one of these coefficients is unequal to zero. Moreover, some of the coefficients k, m or g will, in general be unequal to zero.

A general property of a quadripole built up with a gyrator is that $Z_{12}$ is unequal to $Z_{21}$.

Fig. 4 shows one example of application of a gyrator in a preferred circuit according to the invention. The electrical quadripole is intercoupled between the anode circuit of a first electron tube 16 and the grid circuit of a second electron tube 17. The primary terminals 1 of the gyrator 3 are connected to an oscillatory circuit 12, comprising inductance and capacitance, which is coupled to the anode circuit of said first tube 16 by means of coupling winding 18 connected to the anode of tube 16, and which is tuned to the central frequency of electrical oscillations to be transmitted, while the secondary terminals 2 are connected to a similar oscillatory circuit 13, which is connected to the grid circuit of said second tube 17. The lower terminal 1 and the lower terminal 2 are connected to a point of constant potential, and the upper terminals 1 and 2 are interconnected through a resistive coupling impedance 14. It has now been found to be possible to dimension the resistive coupling impedance 14 and the gyrator coupling 3 in such manner with respect to one another that the circuit behaves like a bandpass filter. If in this case the gyrator coupling has the correct sign with respect to the direct current coupling, so that the two couplings support one another, i.e., so that the direct current resistive coupling produces an additional voltage at the output terminals 2, it has been found that with a similar bandwidth and with similar input and output impedances as with a conventional bandpass filter comprising inductively or capacitatively coupled circuits, the transmission ratio is, with critical coupling, a factor $1+\sqrt{2}$ as great. This increase of transmission ratio in the forward direction is at the cost of the transmission ratio in the reverse direction. The proof of this theorem is given in my later paper Phil. Res. Reports, vol. 6 (April 1951), pages 86–95.

In Fig. 5 the quadripole shown in Fig. 2 is inserted in the circuit of Fig. 4, use being made in a suitable manner of the coils 4 and 7 for the inductances included in the circuits 12 and 13, while a similar resistive coupling impedance 14 increases the transmission ratio of the transfer impedance between the anode of tube 16 and the grid of tube 17.

What is claimed is:

1. A circuit arrangement comprising first and second electron tubes having grid and anode circuits, first and second resonant circuits, said first resonant circuit being inserted in the anode circuit of said first electron tube and said second resonant circuit being inserted in the grid circuit of said second electron tube, and a passive electrical quadripole having input and output terminals, said input terminals being coupled to said anode circuit of said first electron tube and said output terminals being coupled to said grid circuit of said second electron tube, said quadripole comprising a polarizable medium, which is polarized in a first direction, means connected to said input terminals to produce a primary field in said medium in a second direction different from said first direction, said primary field producing in said polarized medium a secondary field having a third direction different from said first and second directions, and means coupled to said secondary field to produce a voltage at said output terminals, a resistive element being interconnected between said input and said output terminals to produce an additional voltage at said output terminals.

2. In an amplifying system wherein successive first and second electron discharge tube amplifier stages are each provided with an input and output circuit and wherein a signal to be amplified is fed to the input circuit of the first stage; apparatus for intercoupling said first and second amplifying stages comprising a four-terminal passive network provided with a polarized medium possessing gyromagnetic properties, input terminals to apply an input voltage and an input current to said network and output terminals to take an output voltage and an output current from said network, first and second resonant circuits coupled across said input and output terminals respectively, means coupling said first resonant circuit to the output circuit of said first stage, means coupling said second resonant circuit to the input circuit of said second stage, and a resistive element interconnecting one of said input terminals with one of said output terminals to produce an additional voltage at said output terminals.

3. Apparatus, as set forth in claim 2, wherein said first and second resonant circuits are tuned to the central frequency in the frequency spectrum of said signal.

4. In an amplifying system wherein successive first and second electron discharge tube amplifier stages are each provided with an input and an output circuit and wherein a signal to be amplified is fed to the input circuit of the first stage; apparatus for intercoupling said first and second stages comprising a four-terminal passive network including a polarized medium possessing gyromagnetic properties, input and output coils coupled to said medium at mutually perpendicular positions, input terminals connected to said input coil to apply an input voltage and an input current to said network and output terminals connected to said output coil to take an output voltage and an output current from said network, a first condenser connected across said input terminals to form a first resonant circuit with said input coil tuned to the central frequency of said signal, a second condenser connected across said output terminals to form with said output coil a second resonant circuit tuned to said central frequency, means coupling said first resonant circuit to the output circuit of said first stage, means coupling said second resonant circuit to the input circuit of said second stage, and a resistive element interconnecting one of said input terminals to one of said output terminals to produce an additional voltage at said output terminals.

5. Apparatus, as set forth in claim 4, wherein each of said stages includes an electron discharge tube having a grid electrode connected to the input circuit thereof and an anode connected to the output circuit thereof, and wherein said means coupling said first resonant circuit to the output circuit of said first stage includes an inductor coupled to said first resonant circuit and connected to the anode of the tube in said first stage.

6. A circuit arrangement comprising a source of electrical signals, a polarizable medium having gyromagnetic properties, means for polarizing said medium in a first direction, signal input means connected to apply said signals to said medium to produce a primary field in said medium in a second direction different from said first direction, thereby producing in said polarized medium a secondary field having a third direction different from said first and second directions, signal output means coupled to said secondary field to produce an output voltage, an output circuit connected to receive said output voltage, and an impedance element connected between said signal input means and said signal output means to produce an increased output voltage at said output circuit.

7. A circuit arrangement comprising a source of electrical signals, a medium possessing gyromagnetic properties and adapted to be brought into a state of magnetic saturation, means for magnetically saturating said medium in a first direction, signal input means connected to apply said signals to said medium to produce a primary field in said medium in a second direction different from said first direction, thereby producing in said polarized medium a secondary field having a third direction different from said first and second directions, signal output means coupled to said secondary field to produce an output voltage, an output circuit connected to receive said output voltage, and an impedance element connected between said signal input means and said signal output means to produce an increased output voltage at said output circuit.

8. A circuit arrangement comprising first and second amplifiers, a first circuit connected to the output of said first amplifier, a polarizable medium, means for polarizing said medium in a first direction, said first circuit being positioned to produce a primary field in said medium in a second direction different from said first direction, thereby producing in said polarized medium a secondary field having a third direction different from said first and second directions, a second circuit coupled to said secondary field to produce an output voltage, means connected to apply said output voltage to the input of said second amplifier, and an impedance element connected between said first and second circuits to produce an increased voltage at said input of the second amplifier.

9. A circuit arrangement comprising a source of electrical signals, a polarizable medium of magnetic material having gyromagnetic properties, means for polarizing said medium in a first direction, signal input means connected to apply said signals to said medium to produce a primary field in said medium in a second direction different from said first direction, thereby producing in said polarized medium a secondary field having a third direction different from said first and second directions, signal output means coupled to said secondary field to produce an output voltage, an output circuit connected to receive said output voltage, and an impedance element connected between said signal input means and said signal output means to produce an additional voltage at said output circuit to increase the signal energy produced at said output circuit.

10. A circuit arrangement comprising a source of electrical signals, a polarizable medium of magnetic material having gyromagnetic properties and adapted to be brought into a state of saturation, means for producing a magnetic field in a first direction in said medium of sufficient magnitude to bring said medium into a state of saturation, signal input means positioned to apply to said medium a first alternating magnetic field in a second direction different from said first direction, whereby there is produced in said medium, as a consequence of said gyromagnetic properties, a second alternating magnetic field in a third direction different from said first and said second directions, signal output means positioned to intercept said second alternating magnetic field to produce corresponding output signals, and a further passive electrical impedance element coupled between said signal input means and said signal output means to produce increased output signals, said impedance element being dimensioned to increase the signal transmission from said first to said second signal means at the cost of the signal transmission from said second to said first signal means.

11. A circuit arrangement comprising a source of electrical signals, a polarizable medium having gyromagnetic properties, means for polarizing said medium in a first direction, signal input means connected to apply said signals to said medium to produce a primary field in said medium in a second direction different from said first direction, thereby producing in said polarized medium a secondary field having a third direction different from said first and second directions, signal output means coupled to said secondary field to produce an output voltage, and means conductive to said signals arranged between said signal input means and said signal output means to produce an increased output voltage.

References Cited in the file of this patent
UNITED STATES PATENTS
2,780,779    Hansen _____ Feb. 5, 1957